C. N. ANDREWS.
APPARATUS FOR PRODUCING TALKING MOTION PICTURE ENTERTAINMENTS.
APPLICATION FILED SEPT. 23, 1915. RENEWED MAY 13, 1920.
1,354,272.
Patented Sept. 28, 1920.
4 SHEETS—SHEET 2.
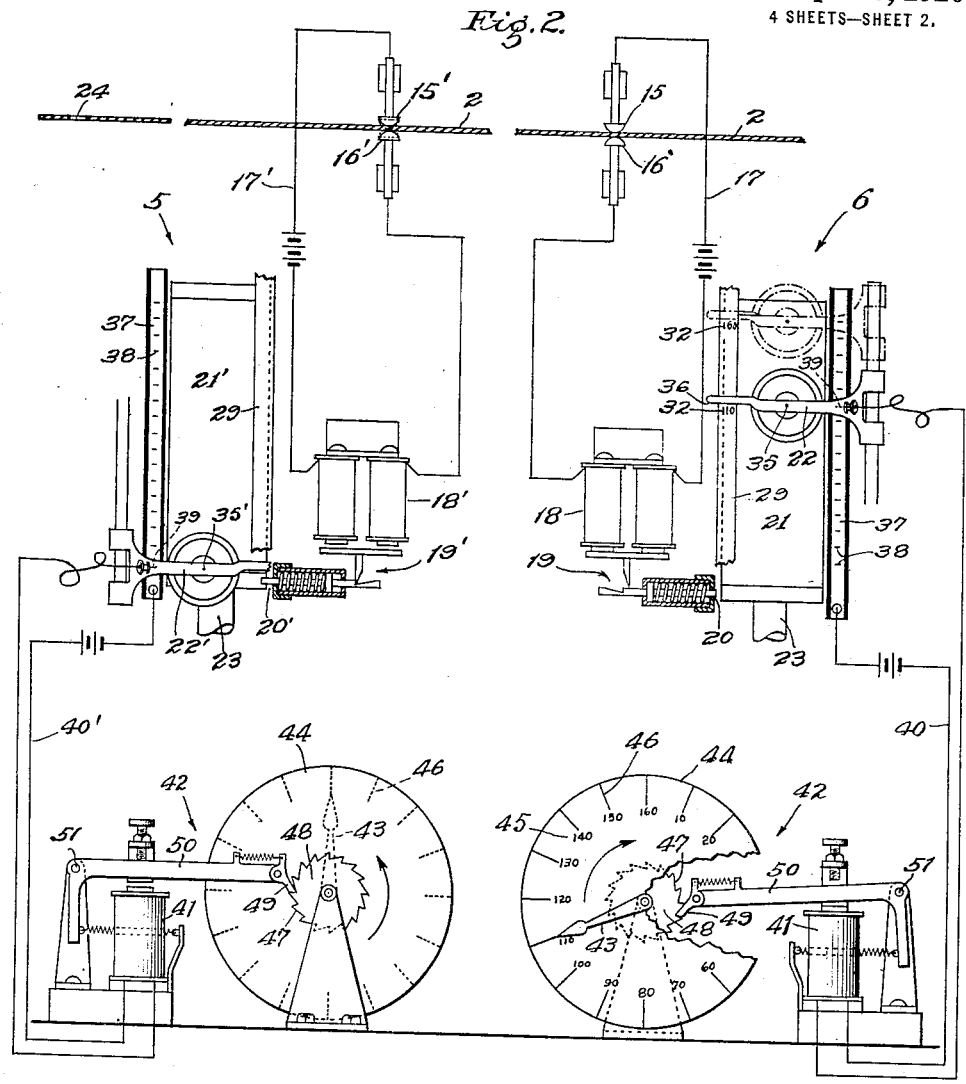
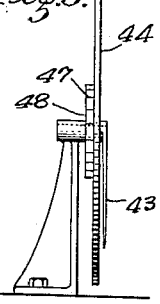
Witness
H. N. Kirkby
Inventor
Cyrus N. Andrews
by James R. Townsend
his atty.

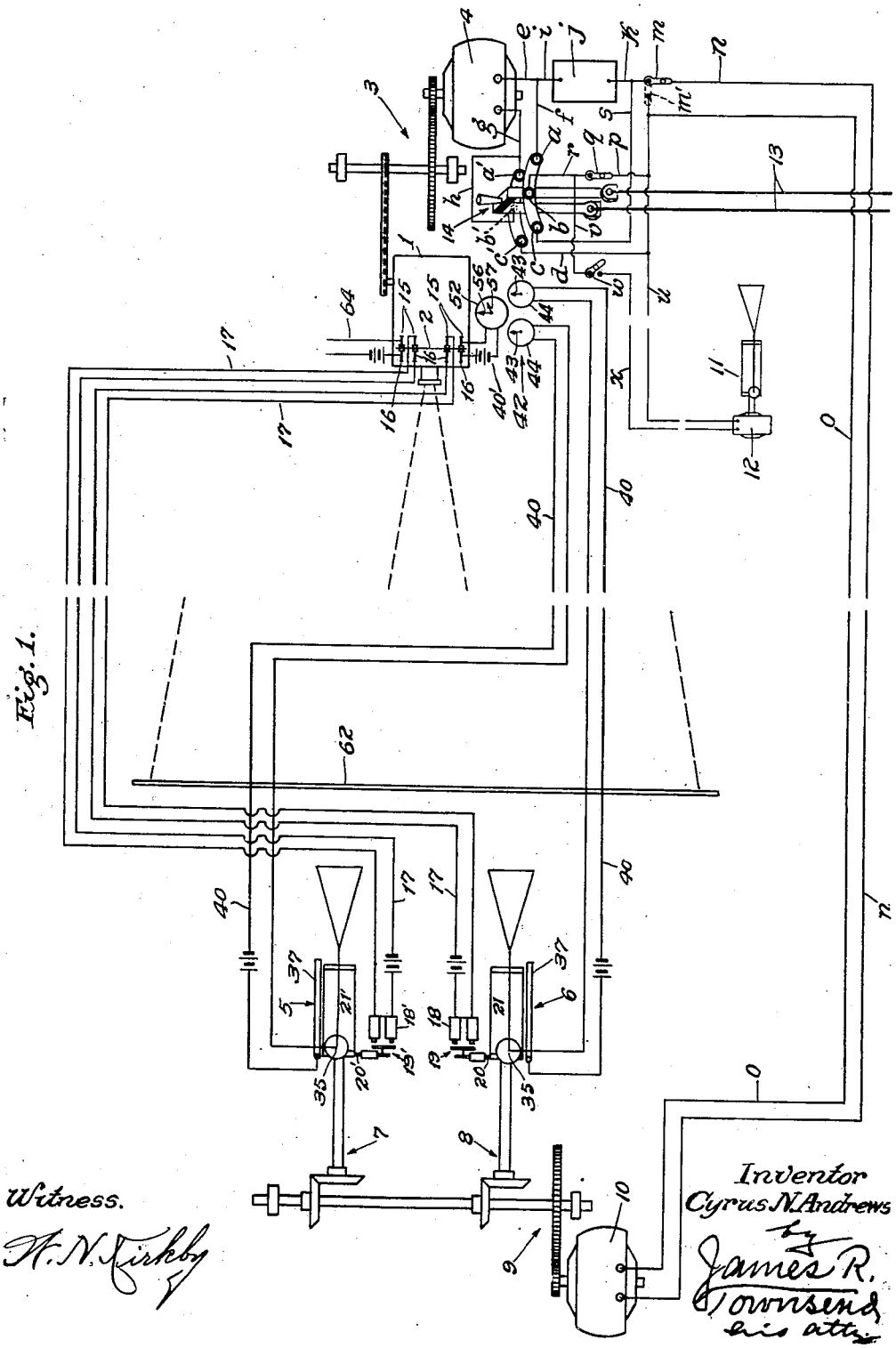

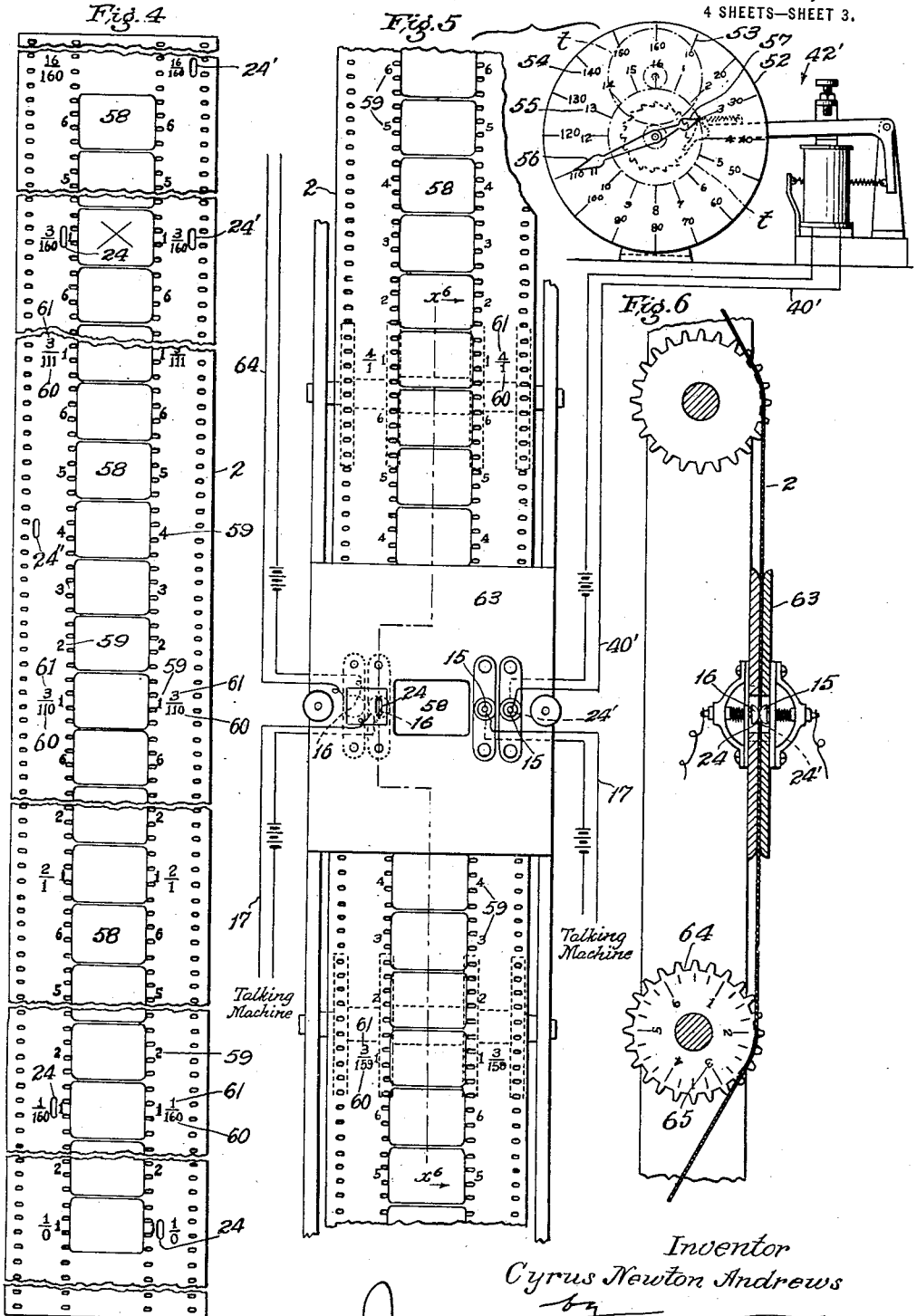

C. N. ANDREWS.
APPARATUS FOR PRODUCING TALKING MOTION PICTURE ENTERTAINMENTS.
APPLICATION FILED SEPT. 23, 1915. RENEWED MAY 13, 1920.
1,354,272.
Patented Sept. 28, 1920.
4 SHEETS—SHEET 4.
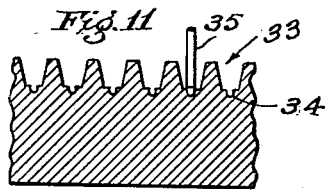
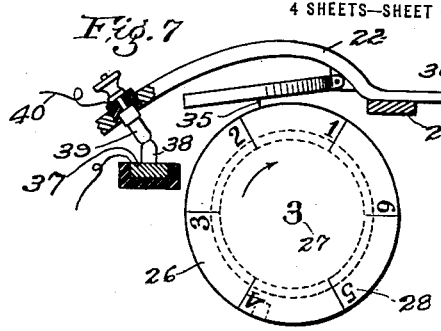
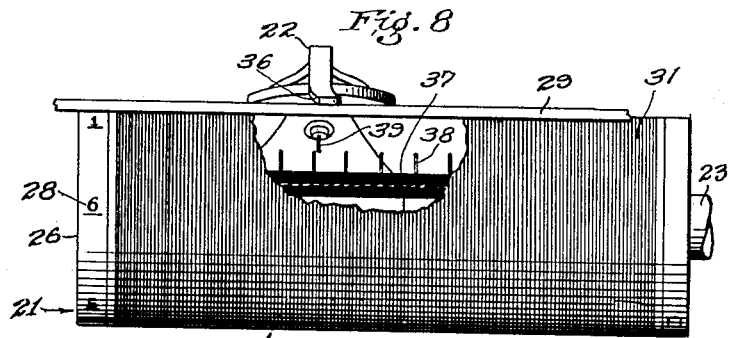
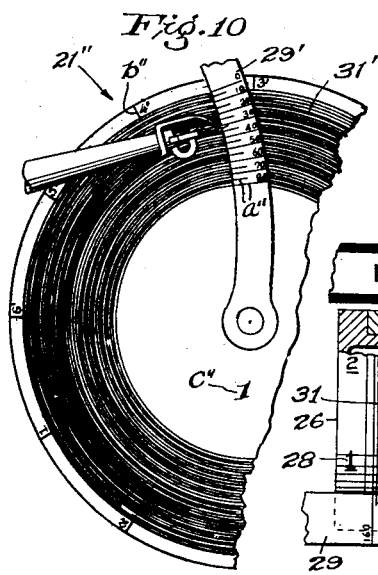
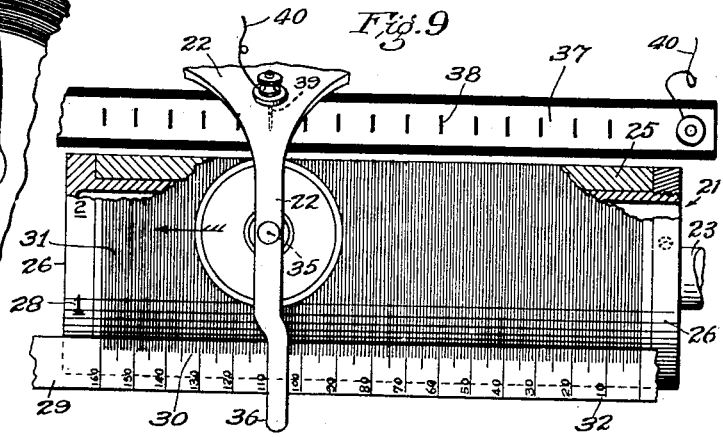
Witness
C. C. Holly
Inventor
Cyrus Newton Andrews
James R. Townsend
his atty.

UNITED STATES PATENT OFFICE.

CYRUS NEWTON ANDREWS, OF YUCAIPA, CALIFORNIA.

APPARATUS FOR PRODUCING TALKING-MOTION-PICTURE ENTERTAINMENTS.

1,354,272.     Specification of Letters Patent.     Patented Sept. 28, 1920.

Application filed September 23, 1915, Serial No. 52,306. Renewed May 13, 1920. Serial No. 381,211.

*To all whom it may concern:*

Be it known that I, CYRUS NEWTON ANDREWS, a citizen of the United States, residing at Yucaipa, in the county of San Bernardino and State of California, have invented a new and useful Apparatus for Producing Talking-Motion-Picture Entertainments, of which the following is a specification.

This invention includes features disclosed in my application for United States Letters-Patent on audiopticon, filed in the United States Patent Office, Nov. 18, 1914, Serial No. 872,853, and features of this invention are applicable in the production of records from sound and motion performances or occurrences as well as in connection with the reproduction of sounds and pictures from such records.

In my said application for Letters Patent I have shown an audience or exhibition chamber having picture screens at its opposite ends and picture projecting and sound reproducing apparatus for the purpose of reproducing synchronously, pictures with the sound accompaniments in such a manner that a reversely-seated audience will receive corresponding visual and auditory impressions. In this application there will be shown only one of the projecting machines and one of the picture screens, in order to avoid unnecessary illustration and to avoid confusion of lines.

In preparing records for such an exhibition it is important that the sound records produced shall be of fine quality and it is difficult to effect such production from a single stationary sound-receiver; and an object of this invention is to make provision whereby during the production of the synchronous sound and picture records a plurality of sound record making machines may be distributed over the ground, and while concealed may be kept in practical synchronism with the picture record making machine; and whereby the sounds and motions thus recorded may be reproduced in like synchronism. In the motion picture art it is customary to produce parts of the action at different and somewhat widely-separated periods of time and in reproducing the action in a picture the several parts of the picture are brought together by simply piecing together the motion picture record ribbon or film and passing the same through the projecting machine. Owing to the rapid transition from one view to another in the reproduction of the picture it is of slight consequence that the consecutive parts of the pictures may have been produced at different times; but when it is attempted to reproduce sounds in connection with the motion reproduction it is absolutely necessary that both reproductions shall be in exact synchronous relation with each other, and it is necessary wherever a break occurs that there be some means for restoring or locating the sound part with perfect exactitude relative to the restoration of the motion part of the reproduction.

A very serious and difficult problem is here involved and an object of this invention is to solve such problem in a practical and effective manner. A further object is to accomplish this in the simplest and most direct manner possible so as to eliminate all liability of discordant reproduction of the sound and motion parts of any action.

I have solved this problem by making the picture record the primary unit of the synchronizing mechanism and I regard my invention as still more far-reaching and pioneer in its nature in that I have marked upon the picture record, definitely-located indices and have provided a dial having corresponding indices and have provided means actuated by the picture record ribbon and adapted to correspondingly actuate the dial, and I have provided the picture record ribbon not only with the indices marked thereon, but also with slots in determined relation with such indices and have combined with the ribbon so constructed, mechanism coöperating with the slotted record ribbon and actuated thereby to actuate the dial in true relation to the indices on the ribbon, so that by inspecting the dial the operator is relieved from all necessity of inspecting the ribbon, and in this way I have eliminated much of the difficulty of determining the position of the respective views of the recorded motion.

This is of special advantage in the operation of bringing together for coördination the sound record and the picture record in preparing to start a reproduction and also in making up a consecutive reproduction from a plurality of record parts. It is also of great value during the operation of the machine by enabling the operator to visually determine the synchronism of the sound and picture records, thus eliminating all confusion arising from the noise of operating the machine and from applause of the audience or from street noises or other extraneous sounds.

An object of the invention in a general way is to provide means whereby it is made practical to record and reproduce satisfactorily as a unitary production both the auditory and the visual parts of any entertainment or occurrence.

It is understood that in accomplishing this general object it is necessary that the sound and motion reproductions may appeal to the audience as being synchronous and an object of the invention is to provide means whereby the effect of perfect synchronism between the visual and auditory parts of the reproduction is secured.

In attaining this object I have provided an apparatus including inter-indexed visual and auditory records that have direct relation to each other in all parts relating to synchronism.

In carrying out this invention I have adopted for indexing purposes certain basal units that for convenience I term picture units and sound units respectively; the first relating to the picture or motion records and the second relating to the sound records.

Owing to the fact that in present practice motion pictures are produced by the reproduction on the screen of 16 pictures per second I have adopted 1/16 of a second as the period of each of said units; and consequently, each picture unit is represented by one frame or picture, and since there are sixteen of these frames in each second of the reproduction there will be 960 pictures or frames projected in one minute's operation of the machine.

As at present operated, record cylinders of sound-reproducing machines are set to run 160 revolutions per minute and it follows that each revolution of such a cylinder would represent the projection of 1/160th of 960 pictures, viz., six pictures upon the screen; and I have provided each sound record cylinder, on its end, with what I term a segmental index of six numbers from 1 to 6, inclusive, representing six frames or pictures on the film to be projected at one revolution of the cylinder, and this index is employed in combination with what I term a circumferential index, the same being conveniently applied on a scale alongside the cylinder as the same is being operated, said scale being marked with 160 graduations indicated by tens; and by the combination of the two indexes thus provided and certain indexes on the picture record device I have made it possible to locate on the cylinder, any portion of the auditory or sound record corresponding to the action represented by any single picture or frame of the accompanying motion picture film.

This feature of the invention is also applicable to the disk machine as will be understood by those versed in the art.

I propose by the present invention to make provision whereby the operator can readily and exactly locate upon the visual record device and upon the auditory record device the parts thereof that should be simultaneously in action; and also to enable the operator at a station, to be able to note at any instant, the relative operative positions of the visual and auditory records and to correct such relative positions so as to bring the sound and action reproductions into exact synchronism.

It is necessary in order to maintain exact relations between the picture record and the sound record that the recording and the reproducing needles shall be prevented from jumping across from one to another of the turns or helical members or limbs of the record device and in this invention there are provided means whereby such jumping is prevented.

It is necessary that the stylus or needle of a sound record producing machine or of a sound reproducing machine be allowed to have free movement both laterally and perpendicularly in order to make records and to reproduce the sounds satisfactorily, and I have discovered that by providing in the record, grooves having floors of somewhat greater width than the point of the stylus or needle, it is possible to prevent any such jumping and yet at the same time allow perfect reproduction; and this invention includes the combination with certain indexes, of means to prevent the stylus or needle from shifting out of true relation to the record, so that there will be no jumping of the needle from one limb or turn to another of the record, and certainty of the index will be insured.

For the sake of accuracy I prepare the sound record devices by providing them with grooves of sufficient depth to prevent the needle from jumping from one limb or turn to another, and form said grooves with floors that are wider than the stylus point, and the traces of which, transversely of the groove in cylindrical records, are parallel to the axis of the record cylinder; and this necessarily requires a greater length of cylinder for a certain production than is required with the usual record in which no provision is made to prevent the needle from jumping from limb to limb of the record.

In practice, I find that, as compared with the usual cylinder, the length of my deep groove cylinder necessary to reproduce for one minute will be practically as 6 to 1.

In disk record devices spiral record grooves are provided with flat floors somewhat wider than the point of the stylus.

As before stated the pictures are projected at the rate of 960 per minute, and the reproduction in each minute from the record of a talking machine using record cylinders, is represented by 160 revolutions of such cylinder; and each revolution represents six pictures and the segmental index and circumferential index and the motion record indexes I have provided can together be employed to exactly locate the position of the needle on the sound record for any one of the 960 pictures occurring on the picture record for one minute's operation.

Since the films or picture records are of much greater length than that required for one minute's run, it becomes necessary to use a plurality of sound record devices and said record devices are indexed consecutively, as record sections, and corresponding indices are placed upon the picture record device and the sound record devices as will more fully appear from the subjoined detail description.

By this method of indexing it becomes possible to exactly locate the corresponding parts of the visual and auditory records, but it is essential that the operator shall be at all times informed of the relative positions of the picture and its accompanying sound record; and for this purpose dials are provided and operatively connected with the indexed record devices for the purpose of indicating to the operator the relative positions of the active parts of the two records, and means are also provided whereby adjustment of the sound record device can be effected to bring it into proper relation with the picture record device.

An object of this invention is to provide index means whereby the correlation between the auditory and visual reproductions can be mechanically determined and brought under observation and to provide means for justifying one by the other, so that the synchronism of the two machines may be insured practically during the operation of both machines, irrespective of whether either of the records is active: thereby to insure synchronous action of the correlated parts of the two records.

A further feature of the invention consists in the indexing means and the means by which the same is made available for the operator of the machines.

Other objects, advantages and features of invention may appear from the subjoined detail description.

It is not intended to limit the invention to specific construction and it may be carried out in various ways, and it includes the apparatus, and the various parts and combinations of parts hereinafter described and claimed.

In carrying out this invention I employ two moving records pertaining respectively to the visual and the auditory parts of an occurrence or production; the visual record being made up of a series of units and the auditory record being cyclically arranged; the period of each visual record unit corresponding to the period of a sound record unit forming an aliquot part of a cycle; and indices on said records for correspondingly indicating thereon the related units.

The invention may be understood by reference to the accompanying drawings in which I have shown apparatus constructed in accordance with this invention as arranged for producing talking motion pictures.

Figure 1 is a broken view, mainly diagrammatic, of apparatus constructed for operation, in accordance with this invention. In this view it is assumed that the picture and sound machines shown are for projecting pictures and for reproducing the accompanying sounds, and therefore a screen is shown between the picture machine and the sound machines which are assumed to be talking machines. It is understood, however, that the picture machine shown herein may be a camera and that the sound machines shown may be sound-recorders.

Fig. 2 is a view diagrammatic in character showing a set of sound machines and their indicating dials together with means for electrically connecting the same. In the sound machine at the right, the parts are shown in solid lines in operating position, and are shown in dotted lines at the close of the record. A sound machine at the left is shown in solid lines ready to begin operation. The electrodes are shown out of contact in solid lines. The dotted position of the electrodes at the left is the position occupied to start the sound machine into operation.

Fig. 3 is an edge elevation of one of the dials shown in Fig. 2.

Fig. 4 is a fragmental view of the picture record device or film and shows a picture frame marked X which is in the projecting position in Fig. 5. Parts are broken away at intervals therealong to contract the view.

Fig. 5 is a view partly diagrammatic, illustrating the arrangement of the picture record device and parts of the apparatus connected therewith. A fragment of the film is shown held by the film gate of the picture machine. A record-indicating dial and electro-magnetic means for operating the same are also indicated.

Fig. 6 is a fragmental sectional elevation looking toward the right in Fig. 5 from irregular line $x^6$—$x^6$; electrodes being shown in circuit making position.

Fig. 7 is a fragmental end elevation of a sound record device and parts coöperating therewith, viewed from the left of Fig. 9 showing the contact supporting plate the bus-bar and the scale bar in cross-section.

Fig. 8 is a fragmental elevation from the right of Fig. 7; a part of the record device being broken away showing the electrical contacts of mechanism for operating the indicating dials.

Fig. 9 is a plan of the parts shown in Figs. 7 and 8.

Fig. 10 is a fragmental plan view of parts of the apparatus as applied in a disk form of talking machine.

Fig. 11 is a magnified sectional fragment of the auditory record with a fragment of a reproducing stylus in working position.

The motion record- or picture-machine 1 indicated in Fig. 1 of the drawings may be understood as a projecting machine adapted in the usual way for continual operation in one direction and containing a visual or motion record device 2 shown more particularly in Figs. 4, 5, and 6 as a motion picture film or ribbon.

The motion record machine 1 is connected by suitable mechanism 3 with a motor 4, and sound record machines 5, 6 are connected by suitable mechanism 7, 8, 9, with a motor 10. The motors 4 and 10 are adapted and connected for synchronous operation and are shown as electrical motors connected with each other through a circuit constituting means for normally operating said motors synchronously and provided with means adapted for relatively varying the action of said motors whereby the sound record devices and the sound records thereon can be justified relative to the action record device 2 and action records or pictures thereon.

In said Fig. 1 there is also shown a sound record machine 11 directly driven by a motor 12 and means are provided for operating said motor 12 in substantially the same way as, and both with, and independently of, motor 10.

It is understood that various means may be provided for securing and maintaining the desired relative operation of the several motors of the system or apparatus and that motors 10 and 12 and the sound record machines operated thereby may be increased in number as occasion may demand.

In Fig. 1 a circuit for motors 4 and 10 is shown connected with a power line 13 through the double pole power switch 14 having three pairs of contact points as at $a$, $a'$, $b$, $b'$, and $c$, $c'$.

The motor 4 is connected independently with contact points $a$, $a'$ through the leads $e$, $f$ for $a$ and through lead $g$ for $a'$. It is connected with contact point $b'$ through leads $g$, $h$ and with contact point $b$ through the leads $e$, $i$, synchronizer $j$, lead $k$, switch $m$, lead $n$, motor 10, leads $o$, $p$, switch $q$, and lead $r$. Said motor 10 is also connected independently with the pair of switch contact points, $c$, $c'$ through lead $s$, switch $m$, lead $n$, for point $c$ and leads $o$ and $d$ for point $c'$. By this arrangement, when the switch is thrown to the pair $a$, $a'$ the motor 4 runs alone; and when thrown to $b$, $b'$ the motors 4 and 10 are run synchronously; and when thrown to $c$, $c'$ motor 10 runs independently of motor 4.

It is thus seen that when the switches 14, $m$ and $q$ are in the positions shown in Fig. 1 the motors 4 and 10 are in the same circuit with the synchronizer $j$ and will run at uniform speed step by step with the alternating current from power lead 13 and that when the double pole switch 14 is thrown to the right to contact with $a$, $a'$ the motor 4 will run independently of motor 10 from which the current will be cut off; and that when the power switch 14 is thrown into contact with $c$ and $c'$ the motor 10 will run independently and the power will be cut off from motor 4.

By this arrangement the two motors will run synchronously when the power switch is in contact with $b$, $b'$ and when it is desired to make motor 10 lag behind motor 4 it is only necessary to throw the switch temporarily into contact with $a$, $a'$; and when it is desired to speed up motor 10 relative to the motor 4 the switch 14 will be temporarily thrown into contact with $c$, $c'$.

One pole of motor 12 may be connected with contact point $b$ through the leads $r$, $v$, switch $w$ and lead $x$; and the other pole of 12 may be connected with contact point $b'$ through the leads $u$, $o$ motor 10, lead $n$ switch $m$, lead $k$, synchronizer $j$, leads $i$ and $e$, motor 4, and leads $g$ and $h$ so that when the power switch is in contact with $b$, $b'$ and the switch $m$ connects leads $k$ and $u$, the motors 4, and 12 will run synchronously, the switch $w$ being closed and switch $q$ being opened.

When the gap $m'$ between $u$ and $k$ and the switch at $w$ are open as in Fig. 1 the motor 12 will not be energized.

By reference to Fig. 2 it will be seen that the motion record device or picture film 2 is arranged to run between and normally separate oppositely arranged electrodes 15, 16 that are connected in battery circuit 17 and are adapted to energize the magnets 18 of an electro-magnetic latch 19 constructed in any suitable way to latch the brake 20 of a sound record device 21 or the like. In said Fig. 2, two sound record machines are shown having sound record devices 21, 21' and the latch 19' is shown holding the brake 20' of the record device 21 in record-holding position, the sound record device 21' and the stylus arm 22′ being thus held inactive while the sound record device 21 and stylus arm 22 are in operation.

It is thus seen that when a record device, as the cylinder 21, is placed on the mandrel 23 of one of the sound record machines 5 or 6, as the case may be and the electrodes 15, 16 for the magnet 18 are allowed to contact, the latch 19 is released; thus releasing the brake so that the record device 21 will be released to rotate responsive to the rotating mandrel 23 driven by the motor 10.

The motion record device or picture ribbon 2 holds the electrodes apart except at intervals where starting slots 24 or 24′ are provided in the picture ribbon, and therefore the operation of the auditory or sound record device 21 is subject to control by the motion or visual record device 2.

It is thus seen that in case the brake for the sound record device 21′ is latched by any means, as by an attendant stationed at the sound record machine, it will be unlatched whenever the slot 24′ comes into position to allow the electrodes 15′, 16′ to contact with each other.

Each of the record devices is appropriately indexed and the indicia therefor are in definite relation to each other and I shall now describe the inter-indexes of the sound and motion records.

Taking as an example a cylindrical record device as shown in Figs. 7, 8 and 9, said devices are constructed with a record-receiving body 25 and with durable end portions 26 upon either or both of which are applied indicia 27 of the sectional indexes and the indicia 28 of the segmental indexes. Said durable end portions 26 serve to maintain the sound record devices in working condition.

Owing to the prevalent construction of motion picture and sound record machines above set forth, the segmental indexes of each section or cylinder 21 or the like are made to consist of six equal divisions indicated by the indicia 28 consisting of the numbers 1, 2, 3, 4, 5, 6. Said numbers may be placed on the periphery and on the end of the cap or binding 26 of the sound record device. The circumferential index for each sound record device may be applied to the sound record device by means of a scale plate 29 extending longitudinally of the sound record device and provided with graduations 30 corresponding to the turns or convolutions 31 of the record or record groove of the record device, and said scale is provided with indicia 32 indicating the number of turns or cycles from 1 to 160 of the helical record grooves 33 of the record device.

The indicia 32 are represented as indicating the turns of the record or record groove by tens while the graduations 30 correspond in actual number and in position to the turns 31 of the record 34 formed in the record grooves 33. By this arrangement of indexes it is possible by inspection thereof to determine the exact position of the stylus 35 on the record at any time and said stylus 35 is connected with a pointer 36 that at all times indicates upon the scale 29 the record groove in which the stylus is positioned.

In order that the operator at the picture machine 1 may at all times know where the stylus is located relative to the record, a bus bar 37 is provided with contact points 38 arranged in the path of a movable contact 39 carried by the stylus arm 22 in appropriate relation with the record grooves 33, so that as the stylus arm 22 moves along in the usual way the contact 39 will successively contact with the contact points 38. The contact points 38 and the contact 39 are in a battery circuit 40 with the electromagnets 41 of an electro-magnetic dial-actuating device 42 arranged to operate an index hand 43 on the dial 44 that is provided with indicia 45 corresponding to the indicia 32 of the scale 29, so that in case the parts are all operative and the stylus 35 is started at zero the index hand 43 will be stepped forward by successive impulses through the battery circuit as the contact 39 makes and breaks contact with the contacts 38. In the drawing shown there are sixteen graduations to which indicia are applied and there are on the dial a corresponding number of graduations 46 to which the indicia 45 are applied, and there are sixteen teeth 47 on the ratchet wheel 48 operated by the pawl 49 of a magnetically-operated arm 50 that is pivoted at 51 and oscillated at each energizing impulse of the battery circuit 40. A dial 52 (see Figs. 1 and 5) with graduations 53 and two sets of indicia 54, 55 has hands 56, 57 proportionally operated by an electro-magnetic actuating device 42′ corresponding to that just described and connected to battery circuit 40′ for actuation by the picture machine 1; the hands operating in proportional relation through a suitable train $t$ geared 16 to 1; the longer hand 56 indicating on the circumferential indicia 54 the convolution or turn at which the stylus is acting on the sound record section or cylinder and which is indicated by the shorter hand 57 on the indicia 55 of the section index.

The train $t$ is analogous to the train which relatively moves the hour and minute hand, and said train $t$ moves the short hand 57 and long hand 56 over the dial 52 at the ratio to each other of 1 to 16. Said train, from the nature of the view, is hidden by the dial 52 and is, therefore, shown only in dotted lines and dot-and-dash lines. When the electro-magnetic actuating device 42' is actuated it causes both hands to move and by reason of the train t the shorter hand moves one point to 16 points moved by the longer hand.

In said Fig. 5, for example, it is indicated that the stylus is at turn 110 on sound record cylinder or section 3, there being a set of 16 sections provided for by the indicia of this dial, covering a run of 16 minutes duration.

The picture record ribbon 2 is provided with the usual frames 58 for successive pictures and said frames are indexed in sets of six to correspond with the six unit segments of the sound record device, and the frames of each set are consecutively marked with the indicia 59 of a segmental index to indicate the order of the frames in the set to correspond to the indicia 28 of the segmental index on the sound record device. Said ribbon 2 is also marked with the indicia 60 of a circumferential index indicating the number of circumferential turns on the sound record device, each of which turns correspond to a set of six pictures; and said ribbon is also marked with the indicia 61 of a sectional index indicating the order in its set, of the sound record device in use in the performance. The indicia of the sectional index and of the circumferential index are arranged on the ribbon at the first picture of each set of six pictures; and therefore together serve as indicia for the first of such set and they are arranged in a predetermined manner, so that the operator at a glance will know their meaning, and for convenience in this respect each indice 61 of a sectional index is placed above an indice 60 of the circumferential index.

The ribbon 2 is provided at intervals along its length with operating slots 24, arranged at the first frame or picture of a section of a picture ribbon corresponding to the run of a section of the section record device, that is to say, a section corresponding to 160 turns of the talking machine cylinder, and consequently covering the space of 960 pictures.

The slots or perforations 24 through the ribbon are in staggered relation to each other, being preferably arranged in alternation on opposite sides of the picture frames, one of said slots 24 serving to allow contact with electrodes for one of the sound record machines and the next or second slot on the opposite side of said frames allowing contact of the electrodes for the other sound record machine; and in practical operation both of the sound record machines will be supplied during a part of the time with sound record devices, one in operation and the other latched at rest; so that when the stylus of one machine reaches the end of its record, the electro-magnetic latch of the second machine may be sprung by contact through the operating slot 24 provided for that purpose, and the record device of such second machine will immediately be released and started into action; whereupon the record device upon which the record has just been completed may be removed by any suitable means, as by an attendant, and a fresh record device supplied in lieu thereof and latched against turning and thus held in waiting preparatory to be released when the next operating slot reaches the electrodes therefor.

Slots 24' similar to the staggered slots 24 are appropriately spaced along the ribbon at the side of the picture frames 58 and arranged in a line adjacent the slots 24 upon that side of the ribbon, said slots 24' operating the electrodes 15, 16 that are connected to actuate the hands 56, 57, over dial 52 through circuit 40' as the picture record passes through the picture machine.

The hands 57 and 56 therefore indicate the particular parts of both the sound record and the picture record which are at any time being reproduced. The inspector therefore has the dial 44 by which to locate the sound-record and is also enabled by dial 52 and the hands thereon to locate the picture record, so that in case of cut-outs he will be able to adjust the sound record to the picture record that has not been cut out.

Additional slots 24'' may be suitably positioned along the opposite side of the frames 58 from the slots 24' to appropriately operate the electrodes 15, 16 that are connected through circuit 64 to actuate different appliances, not shown, such as those for bells, guns or the like.

In Fig. 10 the disk 21'' is provided with a scale 29' having indices a and corresponding to the scale 29 in Fig. 9, and thereby the turns 31' may be located as the turns 31 in the cylinder machine.

The inter-indexing is applied in the same manner as in case of the cylindrical record; the disk having its grooves 31' registered with the groove indices a'', and also having segmental indices b'' and a unit index c''.

The screen 62 shown in front of the picture machine in Fig. 1 and the film gate 63 shown in Figs. 5 and 6 may be of any desired construction.

It is seen by the foregoing that I have produced in combination a picture machine 1, sound record machines 5, 6, and means comprising the electrodes 15, 16, 15', 16' battery circuit 17, 17' the brakes 20, 20' the electro-magnetic latches 18, 19 and 18', 19', pertaining to said sound record machines respectively, to produce alternative action of said sound-record machines, and that thereby the operation of the picture machine produces alternate action of said sound record machines; the picture machine ribbon having the staggered perforations 24 therein arranged in lines for alternately receiving the electrodes pertaining to the respective machines; said perforations 24, 24' being spaced along the ribbon at appropriate distances apart for starting each sound record machine into action when the record of the companion sound record machine has reached the close of its record.

By providing the visual record ribbon 2 with index characters 59, 60 and 61 and by providing the index for the auditory record with index characters corresponding with the index characters of the visual record and providing the means including the motors 4 and 10, and the electrical circuit with synchronizer $j$ and double pole switch 14 arranged in said circuit to drive the ribbon and the auditory record at proportional speeds, the required synchronism may be effected.

Since the picture views or frames 58 are numbered consecutively and the index for the auditory record is numbered to correspond to the numbers of the picture views it is an easy matter to locate each view with respect to the auditory record pertaining thereto, and vice versa. By means of index dials 44 and 52 and the double pole switch 14 the justification of the synchronism is readily effected by inspecting the dials and appropriately throwing the switch to relatively speed up or slow down the visual and auditory record machines.

By the means shown to simultaneously drive the auditory record device and the visual record ribbon so as to exhibit any number of picture views equal to the product of the number of grooved indices and the number of segmental indices on the index of the grooved record it is practicable for the operator to locate on the sound record the part thereof at which the action of the picture record may have been cut out in case of injury to the ribbon, or when for any other reason it may be desired to eliminate a portion of the record ribbon.

It is to be noted that the visual record ribbon 2 has its picture views 58 divided into sub-groups numbered with the numbers 59 to correspond with the segmental index of the sound records, and into groups numbered with the numbers 60, and corresponding with the numbers indicating the number of turns on the sound record index; and are divided into super-groups indicated by the characters 61 corresponding with the section indexes for the sound record sections, thus to enable the inspector to readily locate throughout a visual record ribbon of any length the exact location of any picture thereon corresponding to a segment of a turn of the sound record device irrespective of the number of sound record devices required to accompany said visual record ribbon. By this means, when in practice it is desired to eliminate any portion of a sound record to correspond with any elimination or substitution that may be made in the visual record, the location of the required excision of the sound record part can be accurately determined by inspection of the indexes and exact parts of the record ribbon may be supplied by number.

By numbering the picture views consecutively in sub-groups as by the numbers 59 and having some of said picture views at definitely spaced intervals numbered consecutively in groups as by the numbers 60, and providing in combination therewith an auditory record having its grooves consecutively numbered as by the numbers 32 to correspond with the numbers of said groups at 60, and having its circumferential segmental portions numbered as at 28 to correspond with the numbers of said sub-groups at 59 on the picture record, the synchronism or lack thereof and the remedy therefor can be readily determined by inspection of the records.

The sound record machines 5, 6 and 11 are relatively movable so that they may be stationed in various relative positions and for the purpose of making the sound record machines 5 and 6 movable relative to each other the shafts 7 and 8 may be flexible after well known forms of construction.

In Fig. 6 the sprocket wheel 64 that drives the picture record ribbon 2 is provided with a segmental index and segment indices 65 and care is taken, when the ribbon and record devices are applied that the indicia 65 of the sprocket wheel 64 are in appropriate relation to the indicia 59 on the record ribbon and the indicia 28 on the record device so that the operator by inspection thereof and of the dials can determine the agreement of the segments of the sound record with the frames of the picture record.

It is particularly noted that the circuit including the two motors 4 and 10 practically constitutes a unitary operating means to effect synchronism between the dials and the auditory and visual records, and when the apparatus is properly adjusted and is in operation, inspection of either dial 44 or 52 will enable the operator to determine the location on the sound record device, of that portion of the sound record which is that moment active.

I claim:—

1. The combination with an auditory record having indicia thereon, of a motion picture film having corresponding indicia, a dial adapted and arranged to be actuated in synchronism with both the auditory record and the picture film to indicate the position of the active portion of the auditory record, and means to effect synchronism between said record and film.

2. In combination, a motion picture ribbon provided with a series of picture views numbered consecutively; an auditory record; an index for said auditory record numbered to correspond to the numbers of the picture views; dials operably connected to the auditory record and to the picture film and adapted to indicate the active portions of said auditory record and picture film; and means to effect synchronism between the ribbon and the auditory record.

3. In combination, an auditory record, indicia for the grooves of said auditory record, segmental-indicia arranged circumferentially of said auditory record, and a visual record ribbon indexed to correspond to said groove-indicia and segmental-indicia.

4. In combination, an auditory grooved record, an index registering with each turn of the record groove, indicia placed circumferentially around the auditory record, a visual record ribbon provided with a series of picture views, and means to simultaneously drive the auditory record and the ribbon so as to exhibit a number of picture views equal to the product of the number of groove-indices and the number of segmental-indicia.

5. In combination, a talking machine provided with a graduated scale plate longitudinally along the mandrel, and a cylindrical auditory record for the mandrel graduated circumferentially, said graduated scale plate and circumferential graduations together indicating definite portions of the record, and a picture machine provided with a graduated film ribbon, the graduations of which are in correspondence with the graduations of the scale plate.

6. In combination, a talking machine provided with a graduated scale plate longitudinally along the mandrel, said scale plate having the graduations numbered, a cylindrical auditory record for the mandrel graduated circumferentially and provided with numbers for the graduations, said graduated scale plate and circumferential graduations together indicating definite portions of the record, a picture machine, a visual record ribbon for the picture machine provided with numbers corresponding to the numbers on the scale plate and auditory record, and means to synchronously operate the talking machine and picture machine to simultaneously reproduce the portions of the auditory record and visual record having like numbers.

7. In combination, a talking machine provided with a graduated scale plate extending along the mandrel of the machine, a cylindrical auditory record for the mandrel provided with circumferential graduations, said graduations being numbered, a picture machine operating in synchronism with the talking machine, a visual record ribbon for the picture machine having picture views numbered to correspond with the numbers on the scale plate and auditory record, said talking machine and picture machine being timed to simultaneously reproduce the portions of the auditory record and ribbon that have like numbers.

8. In combination, a visual record ribbon having its picture views consecutively numbered in sub-groups and having some of said picture views at definitely-spaced intervals numbered consecutively in a group, an auditory record having its grooves consecutively numbered to correspond with the numbers of said groups and having its different circumferential segmental portions numbered to correspond with the numbers of said sub-groups, and means to synchronously operate the record ribbon and auditory record.

9. In combination, a visual record ribbon having its picture views consecutively numbered in sub-groups and having some of said picture views at definitely spaced intervals numbered consecutively in groups and having some of said picture views at other longer spaced intervals numbered consecutively in super-groups, auditory record units numbered consecutively to correspond with numbers of the super-groups, each of said auditory records having its grooves consecutively numbered to correspond with the consecutive numbers of said groups and having its different circumferential segmental portions numbered to correspond with the consecutive numbers of said sub-groups, and means to synchronously operate the record ribbon and auditory record.

10. In combination a motion picture record ribbon having picture views at spaced intervals numbered consecutively, and having slots adjacent the numbers, said slots being in staggered relation from edge to edge of the ribbon; auditory record units corresponding consecutively to the picture views, said auditory record units being numbered to correspond with the consecutive numbers relating to said views and slots; pairs of electrodes on opposite sides of the ribbon, the electrodes of each pair confronting each other and adapted to contact with one another through slots when the slots are brought into registration with said electrodes; latch means electrically connected to the pairs of electrodes respectively and operatable for latching the auditory record at intervals determined by the slots; dial means; and means whereby said dial means are connected to, and are thereby made to operate synchronously with the picture record ribbon and auditory record when the latch means are released.

11. In combination with a picture machine, a sound record machine in which the sound record device is provided with a groove to accommodate the point of the stylus of said sound record machine; said sound record machine also being provided with a graduated scale extending longitudinally along the mandrel of the sound record machine and graduated to indicate the turns of the record groove; said sound record device also being provided with circumferential graduations; said picture machine being provided with a motion record device having an index; said graduated scale and circumferential graduations together indicating definite portions of the record device of said picture machine and said picture machine being provided with a graduated record device, the graduations of which are in correspondence with the graduations for the sound record device.

12. The combination with sound record devices containing sections of a record, said devices being marked with indices of a sectional index; of a scale marked with 160 graduations to indicate the turns of the record on said sound record devices respectively; a picture record device having more than 960 pictures thereon and having indicia in correspondence with the indicia of the sound record indexes; there being 160 turns of each sound record device for each 960 pictures of the motion record device, and said motion record device being provided with a sectional index for each 960 pictures to correspond with the sectional index pertaining to the sound record for said pictures; said motion record device also having indicia for indicating groups of six pictures each and corresponding to the indicia pertaining to said 160 graduations.

13. The combination with a sound record machine having a sound record device and a sound record having turns on said device and indexes for the sound record device to indicate its order and to indicate the turns of the record on said record device; of a dial having thereon indicia corresponding to the two indexes pertaining to the record on the sound record device, and means to operate said record devices synchronously.

14. A talking motion picture apparatus comprising a sound record machine; sectional sound records therefor; indexes indicating the sections of the sound record and the turns of the record on said record device sections; a dial having indicia corresponding to the indicia of said sound record indexes respectively; hands on the dial for indicating the indicia of the indexes on the dial; and means for operating the hands in proportional relation to indicate on the dial the position of the stylus of the sound record machine relative to the parts of the sound record.

15. The combination with a picture record device of sound record devices arranged in indexed sections each of which has indexed segments and turns; said picture record device having indicia corresponding to the indicia of said sections, segments and turns; means to operate the picture record device and a section of the sound record device simultaneously, and indicating means operated by the record devices to indicate the section and the segment in action.

16. In a motion and sound recording or reproducing apparatus a motion record device having indicia thereon to indicate cycles and segments of the sound reproducing record, and means to operate said record device; said operating means being provided with segmental indicating indicia.

17. In a combined motion and sound reproducing apparatus; a sound reproducing record device having indicia thereon to indicate cycles and segments of the sound reproducing record; a motion record device having indicia to indicate cycles and segments of the sound reproducing record and also having operating slots at the first frame or picture pertaining to a section of a sound reproducing record for starting said sound reproducing record device into operation; and means to operate such motion and sound reproducing devices synchronously.

18. In an apparatus of the character set forth the combination with a picture record having indicia, a sound record having indicia, means to simultaneously operate the picture record and the sound record, a dial having indicia thereon corresponding to the indicia of both said records, and means operated by the record-operating means to indicate on the dial the reproducing position of both records.

In testimony whereof I have hereunto set my hand at Yucaipa, California, this 14th day of September, 1915.

CYRUS NEWTON ANDREWS.

In presence of—
D. E. DOLEN,
V. L. DILLOW.